United States Patent
De Blas (10) Patent No.: US 9,682,591 B2
(45) Date of Patent: Jun. 20, 2017

(54) OBJECT COMPRISING A REGION OF ITS SURFACE SUITABLE FOR SHOWING A PLURALITY OF IMAGES

(71) Applicant: Fábrica Nacional De Moneda Y Timbre—Real Casa De La Moneda, Madrid (ES)

(72) Inventor: Julián Zamorano De Blas, Madrid (ES)

(73) Assignee: Fábrica Nacional De Moneda Y Timbre Real Casa De La Moneda (ES)

( * ) Notice: Subject to any disclaimer, the term of this patent is extended or adjusted under 35 U.S.C. 154(b) by 0 days.

(21) Appl. No.: 14/358,968

(22) PCT Filed: Nov. 16, 2012

(86) PCT No.: PCT/EP2012/072809
§ 371 (c)(1),
(2) Date: May 16, 2014

(87) PCT Pub. No.: WO2013/072449
PCT Pub. Date: May 23, 2013

(65) Prior Publication Data
US 2014/0312608 A1    Oct. 23, 2014

(30) Foreign Application Priority Data
Nov. 18, 2011   (EP) .................................... 11382355

(51) Int. Cl.
*B42D 25/00*   (2014.01)
*B42D 25/324*   (2014.01)
(Continued)

(52) U.S. Cl.
CPC .............. *B42D 25/29* (2014.10); *A44C 21/00* (2013.01); *B23K 26/362* (2013.01); *B23K 26/40* (2013.01);
(Continued)

(58) Field of Classification Search
CPC  B42D 25/324; B42D 25/425; B42D 2033/24; B42D 2035/30; G09F 19/14
See application file for complete search history.

(56) References Cited

U.S. PATENT DOCUMENTS 6,043,936 A * 3/2000 Large ................... G06K 19/16
                                                           359/900
8,124,217 B2 * 2/2012 Phillips ................. G02B 5/045
                                                           283/114
(Continued)

FOREIGN PATENT DOCUMENTS

CH    EP 1393925 A1 *  3/2004  ............... B41N 1/06
CH    EP 1580020 A1 *  9/2005  ............. B42D 25/29
(Continued)

OTHER PUBLICATIONS

JP2003015528 Translation (2003).*
Opposition filed in EP Patent Application No. 12787008.7 (EP2779857B1).

*Primary Examiner* — Kyle Grabowski
(74) *Attorney, Agent, or Firm* — Blank Rome LLP (57) ABSTRACT

The present invention relates to an object comprising a region of its surface suitable for showing a plurality of images. Each of these images is observable from a different direction such that upon observing one of the images the other images stop being observable and do not interfere in the viewing of the observed image. The configuration which allows generating the region of surfaces suitable for showing the plurality of images allows for mass production by means of stamping or minting techniques and complicates the (Continued)

reproduction by unauthorized manufacturers. A method which allows obtaining the object having a region suitable for showing a plurality of images is also an object of the present invention.

19 Claims, 5 Drawing Sheets

(51) Int. Cl.
    *B42D 25/425* (2014.01)
    *B42D 25/29* (2014.01)
    *A44C 21/00* (2006.01)
    *G02B 5/124* (2006.01)
    *B23K 26/362* (2014.01)
    *B23K 26/40* (2014.01)
    *B23K 103/04* (2006.01)
    *B23K 103/00* (2006.01)

(52) U.S. Cl.
    CPC .......... *B42D 25/00* (2014.10); *B42D 25/324* (2014.10); *B42D 25/425* (2014.10); *G02B 5/124* (2013.01); *B23K 2203/04* (2013.01); *B23K 2203/50* (2015.10); *Y10T 83/02* (2015.04)

(56) References Cited

U.S. PATENT DOCUMENTS 8,498,033 B2 * 7/2013 Witzman .............. B42D 15/00
    283/86

2004/0011107 A1 * 1/2004 Boegli .................... B31F 1/07
    72/196

FOREIGN PATENT DOCUMENTS

| | | | |
|---|---|---|---|
| CN | 1212923 C | 8/2005 | |
| CN | 101379419 A | 3/2009 | |
| CN | 103717404 A | 4/2014 | |
| EP | 0650853 A1 | 5/1995 | |
| EP | 2 554 397 A1 | 2/2013 | |
| ES | 1071446 U | 3/2010 | |
| FR | 2832811 A1 * | 5/2003 | ........... G02B 5/0231 |
| FR | WO 2010100360 A1 * | 9/2010 | ............ B42D 25/29 |
| GB | 418895 A * | 10/1934 | ............ G09F 19/14 |
| GB | 920430 A * | 3/1963 | ............. B44C 1/222 |
| JP | 08244113 A * | 9/1996 | |
| JP | 2002-326500 A | 11/2002 | |
| JP | 2003015528 A | 1/2003 | |
| JP | 2003015528 A * | 1/2003 | |
| JP | 2009145764 A | 7/2009 | |
| JP | 2010231002 A | 10/2010 | |
| JP | 2011-128269 A | 6/2011 | |
| SG | WO 0224470 A1 * | 3/2002 | ................ B44F 1/10 |
| WO | WO 97/21121 | 6/1997 | |
| WO | 0152685 A2 | 7/2001 | |
| WO | WO 02/24470 | 3/2002 | |
| WO | 2005077674 A2 | 8/2005 | |
| WO | WO 2006/018232 A1 | 2/2006 | |
| WO | WO 2007/079851 A1 | 7/2007 | |
| WO | WO 2007/093300 | 8/2007 | |
| WO | WO 2009/013000 A2 | 1/2009 | |
| WO | WO 2010/075979 | 7/2010 | |
| WO | WO-2013/020687 A1 | 2/2013 | |

* cited by examiner

OBJECT COMPRISING A REGION OF ITS SURFACE SUITABLE FOR SHOWING A PLURALITY OF IMAGES

REFERENCE TO RELATED APPLICATION

The present application is a National Stage of PCT/EP2012/072809 filed Nov. 16, 2012, which claims the benefit of EP 11382355.3 filed Nov. 18, 2011, whose disclosures are hereby incorporated by reference in their entirety into the present disclosure.

OBJECT OF THE INVENTION

The present invention relates to an object comprising a region of its surface suitable for showing a plurality of images. Each of these images is observable from a different direction such that upon observing one of the images the other images stop being observable and do not interfere in the viewing of the observed image.

The configuration which allows generating the region of surfaces suitable for showing the plurality of images allows for the mass production by means of stamping or minting techniques and complicates the reproduction by unauthorized manufacturers.

A method which allows obtaining the object having a region suitable for showing a plurality of images is also an object of the present invention.

An embodiment of the invention particularly has a region suitable for showing a plurality of images where the change in inclination of the observer with respect to the surface where the image is located generates a brightness band which moves as the observer changes his/her inclination, this effect also being independent from that produced in the other images.

BACKGROUND OF THE INVENTION

There are various solutions for printing images by making use of inks or by means of laser engraving techniques which allow generating holographic images. The production cost of techniques of this type and the materials required make their use in coin minting or their incorporation into objects obtained for example by stamping unviable.

Spanish patent with publication number ES2042423 which describes a method for obtaining dual image engravings on rigid surfaces is known. This patent works with surfaces having grooves with different inclinations for generating images. The use of grooves allows easily producing this type of engravings; however, this easy production also facilitates the reproduction by third parties from a piece thus engraved.

The present invention has a surface capable of reproducing a plurality of images such that it tremendously complicates making a copy starting from a genuine object incorporating these images.

DESCRIPTION OF THE INVENTION

A first aspect of the invention is an object comprising a region of its surface suitable for showing a plurality of images such that each image is observable by a user from a direction with a different orientation. The invention establishes a configuration of this region such that when the user observes the region from one direction he/she perceives an image, or part of the image, but not the rest of the images. To observe the rest of the images the user must change his/her observation orientation with respect to the same region. The region showing a plurality of images is preferably flat, however, the invention also allows viewing the plurality of images on surfaces with a certain curve. In these cases the image may not be seen in its entirety from the same orientation and requires slight changes in orientation to perceive the entire image.

The region showing a plurality of images comprises:
A plurality of cavities in low relief regularly distributed on the surface of the region.

The special configuration of the cavities allows viewing different images according to the observation orientation. The use of low relief complicates the production when an object produced in accordance with the invention is provided; however it can be produced at a low cost by means of stamping techniques starting, for example, from a laser-carved punch.

Each of the cavities shows a plurality of side facets, at least one facet per image, where each facet is associated with either a first light level or a light level different from the first.

The invention establishes a first light level and one or more different light levels. The simplest particular embodiment makes use of two light levels, however, in the embodiments there is described a particular embodiment which allows generating shifting effects when the observer progressively changes the inclination of his/her observation point of one of the images based on the use of an appropriately selected range of light levels.

Each cavity is formed by a plurality of facets, facet being understood as a flat region of the cavity and therefore has essentially the same reflection. Each cavity has one facet per image. Each image is thus constructed imposing conditions on the facets which are associated with said image without such conditions affecting the viewing of the rest of the images, and therefore the facets associated with other such images.

The facets which determine an image and are associated with the first light level have the same orientation and inclination with respect to the surface where the cavity is located; and this orientation is different from the orientation of the facets of another different image.

This is how each of the images is generated. At least two light levels are used. Each facet of those which determine an image of the cavity serves as a pixel of the image and is capable of showing at least two light levels. These light levels are independent from those shown by the same cavity due to the orientation which allows observing another different image.

A distinction is made between orientation and inclination. Orientation is the direction normal to the surface of a facet. Throughout the description, inclination refers to the angle formed between a facet and the surface on which the cavity is located. Conceptually, the main surface is what would correspond if there were no cavities. The inclination of a facet is not the orientation of said facet although varying the inclination means varying the orientation.

Different particular cases which also solve different technical problems are described in the detailed description of the invention.

A second aspect of the invention is a method for generating a surface in a region of an object suitable for showing a plurality of images such that each image is observable by a user from a different direction.

The method comprises at least two steps:
establishing a configuration of the surface formed by a plurality of cavities according to any of the embodiments, or the complementary thereof,
carrying out a laser carving process on the surface according to the established configuration.

The method contemplates generating a surface, either directly observable or with the complementary configuration, according to the first aspect of the invention. In this second case the object obtained can in turn result in producing multiple surfaces. This is the case of manufacturing a punch.

A configuration of the surface can be established according to the first inventive aspect, for example, by means of a model which can be depicted by a computer and be transferred to a machine capable of generating surfaces according to the definition of said model.

Laser carving of the surface according to the established configuration results in a surface which allows multiple transfers, for example, by means of subsequent stamping and/or minting operations.

It has been seen that the use of powder metallurgy steels is especially suitable for producing objects which, by stamping, generate objects having a plurality of images according to the first aspect of the invention which are the accurate reproduction of the original computer-generated definition.

DESCRIPTION OF THE DRAWINGS

The foregoing and other features and advantages of the invention will be better understood from the following detailed description of a preferred embodiment, provided only as a non-limiting illustrative example, in reference to the attached drawings.

DETAILED DESCRIPTION OF THE INVENTION

Figure 1:
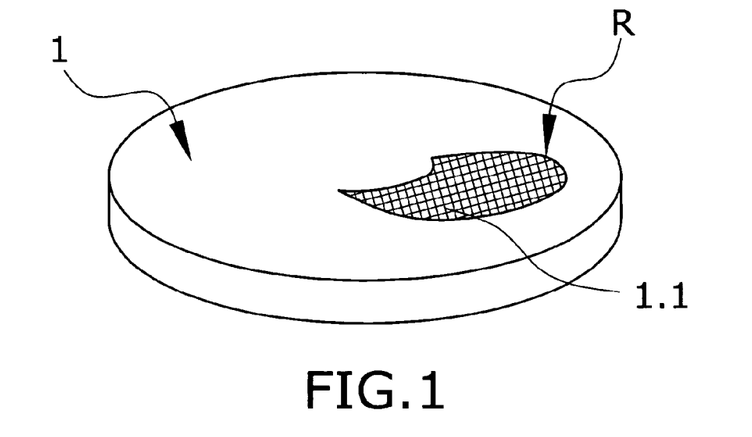
FIG. 1 shows an embodiment where the object comprising a region with a surface suitable for showing a plurality of images is a coin.

A first aspect of the invention is an object comprising a region (R) of its surface suitable for showing a plurality of images. In a first embodiment this object is a coin (1) in which the region (R) suitable for showing a plurality of images is located in at least one of its faces.

Figure 2A:
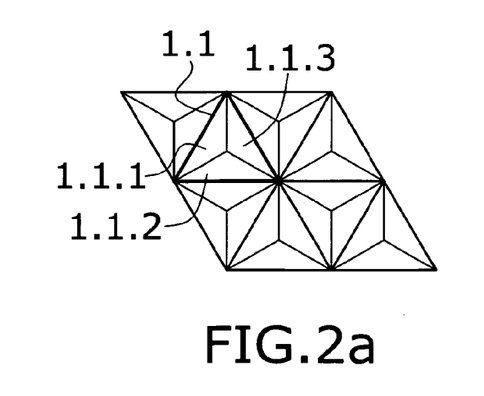
FIGS. 2a, 2b and 2c show three different embodiments of cavity configurations, by means of triangular-, square- and hexagonal-based pyramids.
Figure 2B:
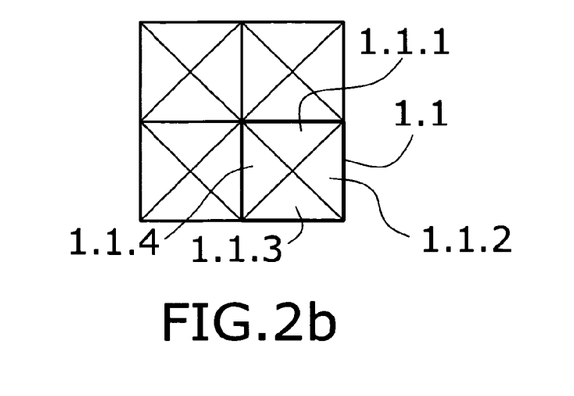
Figure 2C:
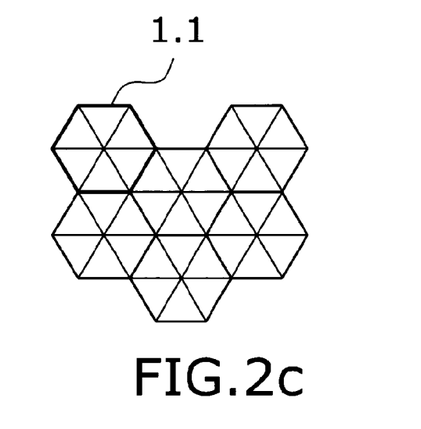

This region (R) comprises a plurality of low relief cavities (1.1) distributed regularly in said region (R). FIGS. 2a, 2b and 2c show different embodiments where the cavities are pyramids such that their base coincides with the main surface of the face of the coin (1); and the triangular faces thereof are set inwards such that the apex is located under the main surface. In another embodiment the pyramids are truncated and therefore have no apex.

FIG. 2a shows a regular distribution of triangular-based pyramids, FIG. 2b shows a regular distribution of square-based pyramids, and FIG. 2c shows a regular distribution of hexagonal-based pyramids. In order to dedicate the entire surface to the reflection as part of one of the images, the regular distribution is such that the entire available surface area is covered; however, a certain separation distance could exist between each of the cavities. These drawings have also only shown a few cavities; however, it is understood that the surface of the region (R) is covered by the repetition of a specific pattern. This pattern is different according to the polygonal configuration of the pyramid base. The use of square-based pyramids, for example, results in a distribution in rows and columns according to a Cartesian structure; however, the use of hexagonal bases results in three main directions (which will result in 6 possible images) considering the projection on the main plane coinciding with the face of the coin (1).

In this embodiment where the cavities (1.1) are polygonal-based pyramids, each of the faces of the pyramid is associated with a different image. These faces of the pyramid are facets (1.1.1, 1.1.2, 1.1.3, 1.1.4). The facets therefore are flat sectors, in this particular case the faces of the pyramids, each of them associated with an image.

Figure 3:
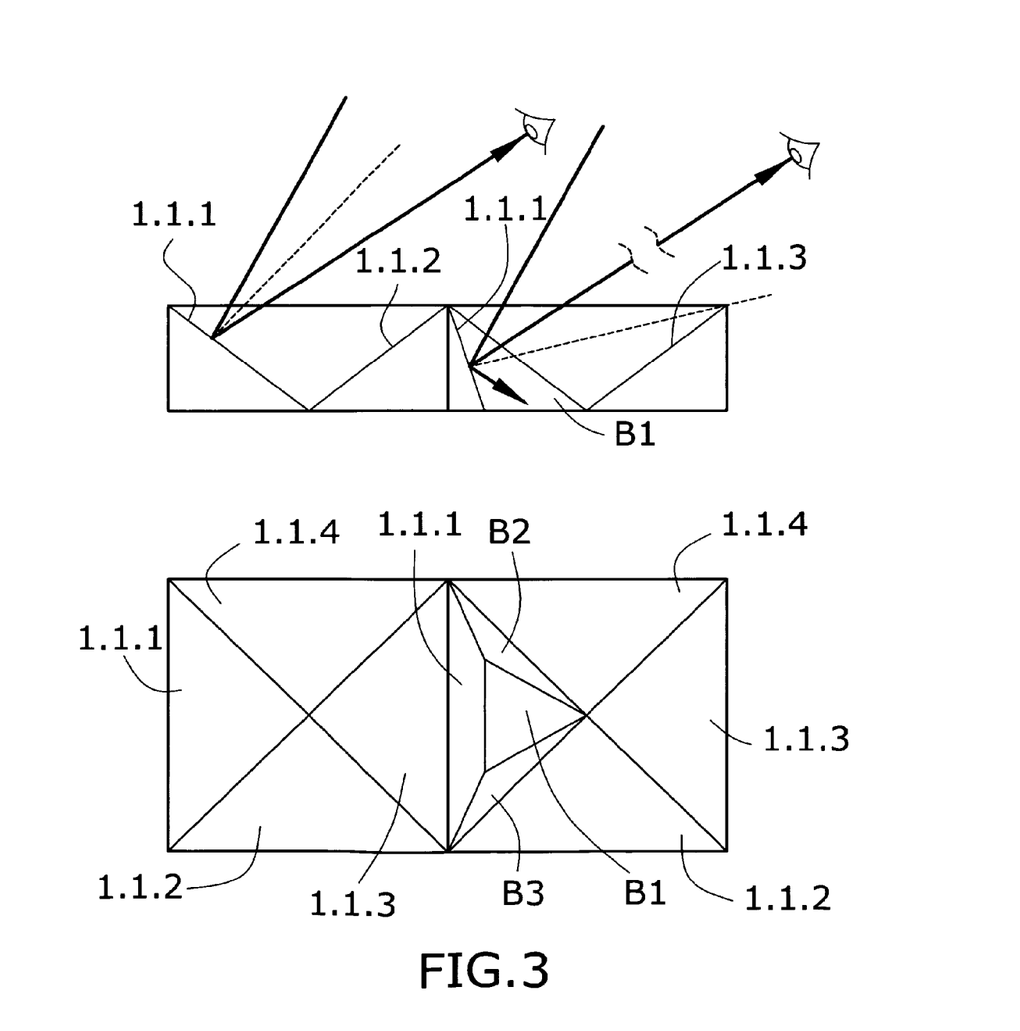
FIG. 3 shows a plan view of two cavities as well as a section perpendicular to the main surface located in the center line of the plan view. Arrows which allow describing the light changes of the facets according to their inclination are shown on the section.

FIG. 3 shows two cavities (1.1) in plan view where the cavities correspond to a configuration in the form of a square-based pyramid. The square base at the outer mouth of the cavity (1.1) and the side walls of the pyramid correspond to the facets (1.1.1, 1.1.2, 1.1.3, 1.1.4). Since the pyramid is a square-based pyramid and has 4 faces, a region made up of this type of cavities (1.1) is capable of showing 4 images.

In this embodiment two light levels, a first light level and a second light level, are used. In this same FIG. 3, in the upper part of the plan view of the two cavities, a section is shown according to a plane perpendicular to the main surface contained in the bases of the pyramids and passing through the two apexes of the cavities.

Considering the cavity (1.1) shown on the left, each of the facets of said cavity has a different normal direction. In this case there are four different orientations. The orientation shown by the four facets of the cavity on the left corresponds to a first light level and it is the level associated with the inclination of the facet if it is the one which corresponds to the regular pyramid.

The eye of an observer receiving the light reflected from an incident beam on the first side facet (1.1.1) of the cavity (1.1) is schematically shown in the section. With this orientation of the region (R) with respect to the observer, the eye of this observer will not receive the light reflected from any of the remaining side facets (1.1.2, 1.1.3, 1.1.4).

The cavity (1.1) shown on the right shows a first side facet (1.1.1) the inclination of which has been increased. The inclination has been increased by means of a rotation with respect to the edge located between the main surface and the side facet (1.1.1). In this case this edge also coincides with the edge resulting from the intersection between the base of the pyramid and the first side facet (1.1.1).

In this embodiment the increase in the inclination of the first side facet (1.1.1) results in the appearance of three sectors (B1, B2, B3) having additional flat surfaces serving as the connecting surfaces between the first side facet (1.1.1)

and its adjacent side facets (1.1.2, 1.1.4), particularly, one sector having a triangular surface (B1) at the bottom parallel to the base or the main surface, and two sectors having oblique triangular side surfaces. This way of connecting the first side facet (1.1.1), with the increased inclination and therefore associated with a second light level, and the side facets is not the only one. Other ways for connecting adjacent side facets will be described in other embodiments.

On this same configuration, in the section corresponding to this cavity (1.1) shown on the right in FIG. 3, it is observed that for an observer located in the same position as the observer schematically shown in the cavity on the left, and, for an incident light beam which also comes from the same direction, the reflected light does not reach the observer rather, in this embodiment, it strikes the base (B1).

In one embodiment, the base (B1) has been made according to a mottled surface reflecting the incident light to a lesser degree to differentiate to a greater degree the difference between the first light level and the second light level.

However, it is possible for the incident beam to end up in the direction where the observer is, but this last direction of reflection is the result of more reflections on several surfaces of the same cavity (1.1). In this case, since each reflection will change the light level, the user will also perceive this change and therefore the image. The greater the difference between the first light level and the second light level, the greater the contrast of the reproduced image.

Continuing with an embodiment and using the particular case of square-based pyramids to describe the invention in detail, since each side facet (1.1.1, 1.1.2, 1.1.3, 1.1.4) is capable of reproducing a different image, in this particular case 4, it is necessary to determine how to assign the light level in each cavity and in each facet to configure the region (R) resulting in a surface which allows viewing the 4 images.

In this embodiment, 4 different images are chosen: a first image showing a letter "M", a second image showing a number, a third image showing a circle and a fourth image showing a symbol.

These images can, for example, be depicted in black and white. Like a black and white digital image, pixels illuminated in white and others in black resulting in two disconnected regions would be distinguished, in this case each cavity (1.1) (actually a facet of said cavity) will perform the function of a pixel and will also be assigned a first light level or a second light level. The first light level, for example, corresponds to the color white and the second light level corresponds to black.

Since each cavity (1.1) has four side facets (1.1.1, 1.1.2, 1.1.3, 1.1.4), the first image will establish in each cavity the inclination that will be adopted by the first side facet (1.1.1), either that shown on the left in FIG. 3 or that shown on the right in FIG. 3, incorporating additional surfaces (B1, B2, B3).

It is possible to do the opposite by interchanging the inclination of the side facets associated with either light level.

Figure 4:
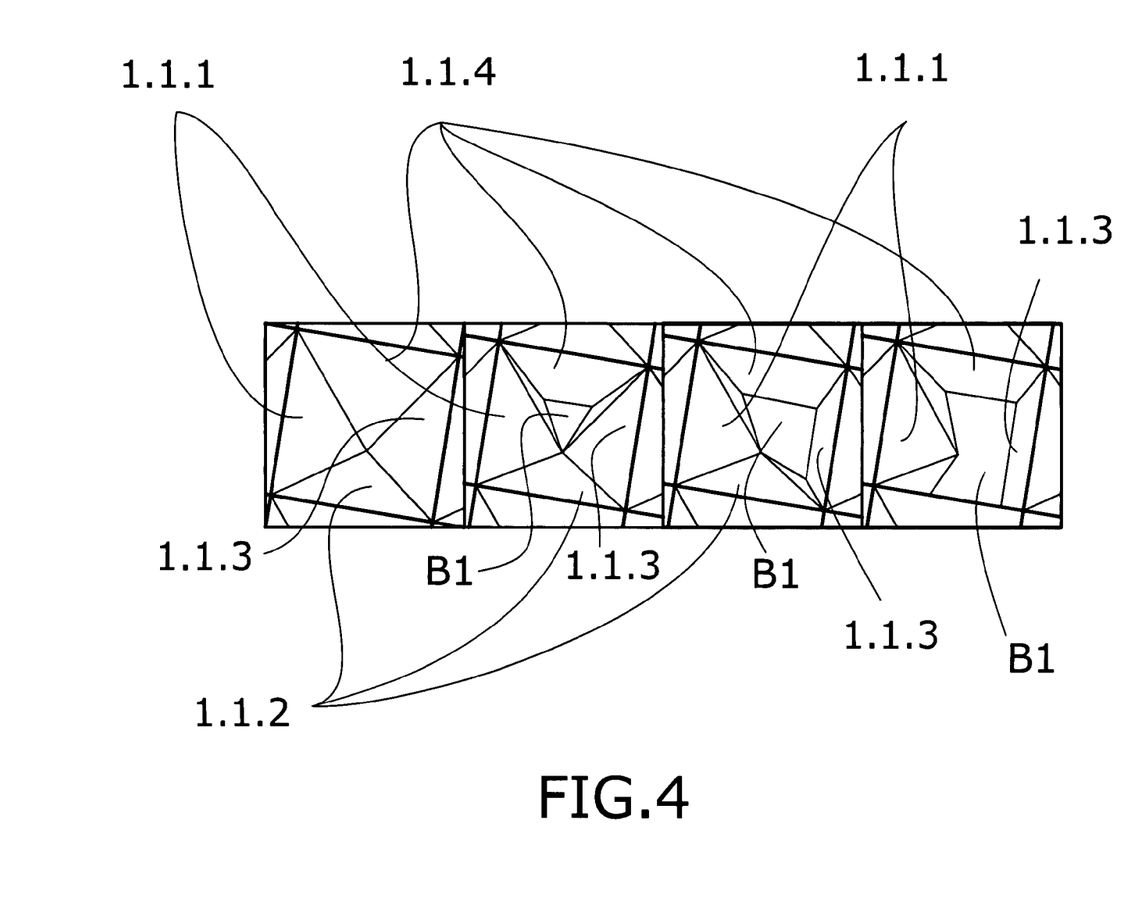
FIG. 4 shows a perspective view of four particular cases of cavities depicting images.

FIG. 4 shows a perspective view of a sequence of 4 different cavities. The cavity shown on the left is an inverted pyramid having four facets (1.1.1, 1.1.2, 1.1.3, 1.1.4) with the same inclination. This case corresponds to the situation in which the four images require showing the first light level in said cavity.

The second cavity starting from the left is a cavity in which the image associated with the facet (1.1.4) located in the upper part (with respect to the orientation of the sheet of the drawing) requires a second light level by increasing its inclination. Close to the apex there are three additional triangular surfaces which are in transition between this side facet (1.1.4) and the rest of the side facets (1.1.1, 1.1.2, 1.1.3) and particularly the base (B1) of the bottom. This configuration of the side facet (1.1.4) with increased inclination does not affect the light level which the rest of the side facets associated with the other 3 images continue to show.

The third cavity starting from the left is a cavity in which two images impose an increased degree of inclination on the upper side facet (1.1.4) and right side facet (1.1.3) (with respect to the orientation of the sheet of the drawing) to show a second light level; and the remaining third and fourth images require in this same cavity (1.1) a first light level and therefore do not require increasing the inclination of the facets located on the left (1.1.1) and below (1.1.2) (also with respect to the orientation of the sheet of the drawing). In this particular case the number of transition surfaces has been reduced by establishing a surface at the bottom (B1) common to the upper facet (1.1.4) and right facet (1.1.3) and only one transition surface with the surfaces the inclination of which has not been modified has been added.

The technical effect of identifying the adjacent side facets the inclination of which has been increased to eliminate interface surfaces leaving a common bottom is the elimination of edges in the cavity (1.1) to depict the same light levels. The reduction of edges in an image is very important because a laser carving-based production process requires transferring the configuration of the surface by means of computer processes and the volume of information to be managed is proportional to the number of edges and apexes. Although the resolution of an image is proportional to the number of cavities (1.1) and it can be high, the number of edges entails several images and entails a very large volume of information which can even result in the saturation of the laser device management systems.

It has already been mentioned that the light levels different from the first light level can be obtained by assigning an increased inclination to the side facets (1.1.1, 1.1.2, 1.1.3, 1.1.4). In the embodiments described, this increased inclination is the same in all the cavities (1.1).

In one embodiment, this inclination different from that of the facets (1.1.1, 1.1.2, 1.1.3, 1.1.4) associated with the first light level is selected in a specific manner.

Figure 5:
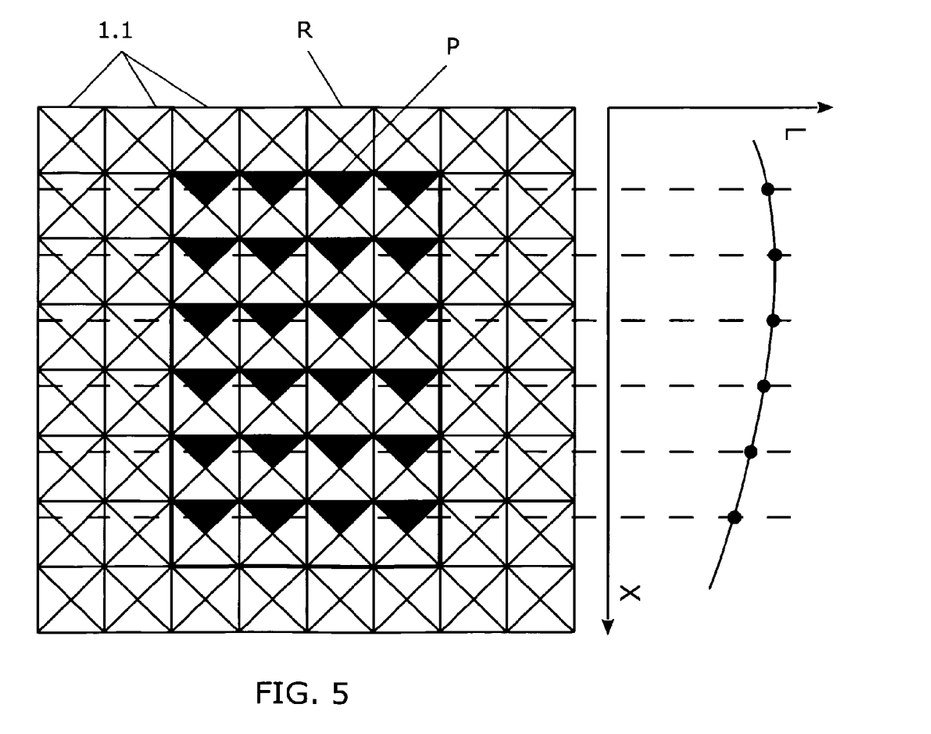
FIG. 5 schematically shows an embodiment where an area of the region where the plurality of images is located shows an effect of the progressive change in brightness for one of the images due to minor changes in orientation of the observer.

FIG. 5 shows a rectangular region (R) on which low relief square-based cavities (1.1) have been arranged distributed in rows and columns. A subset of cavities forming a pattern (P) has been identified from this set of cavities (1.1). This pattern (P), which for the sake of simplicity is also rectangular, could, for example, show an image different from the four images shown by the region (R) and particularly different from the image associated with the side facets arranged in the upper part of this figure and associated with the first image.

According to this embodiment, the pattern (P) will establish a subset of cavities in which the upper side facet (1.1.1), highlighted in black in FIG. 5, if according to the first image must show a light level different from the first light level, then the degree of inclination of the upper side facets (1.1.1) is determined according to a pre-established function.

The right side of the figure shows a function the coordinates of which are the position along a direction perpendicular to a distribution in rows of the cavities (1.1) located in the rectangular area of the pattern (P) and the abscissas the value of the function. In this case the value of the abscissas has been identified as "L" related to the degree of inclination and therefore to the light.

This function, taken at the points corresponding to the position of a specific row, establish the inclination adopted by the side facets (1.1.1) of that row when the image associated with said side facets establishes that the light level is different from the first light level.

FIG. 5 shows with broken lines the site where the discrete values of the X coordinate have been taken in order to take the value of the function corresponding to said coordinate. The value of the discretized function is shown with black circles on the continuous curve of the function.

In this case, the conditions that the cavities of the region (R) must verify are:

The cavities (1.1) are distributed in rows parallel to an edge or a side of the base of the cavity (1.1).

In this case the rows are considered horizontal and therefore parallel to the upper edge or side of the base of the cavity (1.1). If, for example, the cavities were hexagonal-based cavities as shown in FIG. 2c then the distribution in rows could be horizontal or also according to two oblique lines coinciding with the orientation imposed by the edges or sides of the bases of the hexagonal pyramids.

For a plurality of rows parallel to an edge or a side of the base of the cavity (1.1), at least the facets of a set of cavities of one and the same row having an inclination associated with a second light level different from the first light level have the same inclination.

The set of cavities of one and the same row having an inclination associated with a second light level different from the first light level is the set identified by means of the pattern (P). The possibility of selecting a subset of cavities in one and the same row allows observing a brightness effect that can be shifted with the user's progressive change in orientation where this brightness effect can in turn have a form different from that of the image viewed by the user. The selection of this subset of cavities determines the form of this different image.

The inclination of the set of cavities with the same inclination belonging to the different rows varies progressively from row to row and along all the rows.

A simple way of depicting the progressive row-to-row variation of the inclination of the cavities having the same inclination—and not the only one—is the use of the function depicted on the right of FIG. 5.

The function's behavior changes the way of varying the brightness shifting effect when the user changes his/her orientation.

In the example shown in FIG. 5, the pattern (P) is rectangular and the function is a continuous function. The user views a bright band in those rows close to the orientation in which he/she directly perceives the reflected beams. The rows further away from these rows have a different angle and are therefore darker. If the user slightly changes the inclination of the object, the direction where the reflected beams are directly perceived (where the user observes the brightness) will correspond to the rows located progressively above or below the preceding row. The resulting effect while the object moves is the effect where the bright band shifts according to the change in orientation of the object.

Each of the images, there can be up to four images in this embodiment, can have associated therewith its pattern and inclination variation function also independently resulting in the brightness variation effect.

To prevent the pixelated effect and to improve the definition of the depicted images, the characteristic size of the cavities (1.1) must be the smallest possible. Tests have been carried out with prototypes and it has been found that the result is very good when using square-based pyramids with dimensions of the side of the base between 0.1 and 0.3 mm, preferably between 0.15 and 0.20 mm and more preferably 0.16 mm, and a depth of the apex of the pyramid between 0.04 and 0.08 mm, preferably 0.06 mm.

For these dimensions, using milling processes would not produce correct results since rounded edges and planes with fuzzy borders would be obtained, reducing the sharpness and contrast of the depicted images.

A production mode suitable for obtaining an object incorporating a region (R) suitable for showing a plurality of images with such restrictive conditions uses laser equipment on a steel block of those used in cold working tools. The laser used has approximate characteristics of pulse time in nanoseconds and a beam diameter of 10 to 15 µm.

Carving by means of a pulsed laser beam can be carried out directly on the final piece, but if several pieces need to be carved, it is preferably transferred by means of press tamping to an intermediate part or die where it will be inverted, with high relief pyramids, and subsequently to the final piece, where it will be defined with the same configuration as the original obtained by the laser.

The tamping tests conducted have been satisfactory, the original optical effect being maintained in the final piece.

The production process has been tested for coin and medal minting processes.

Figure 6:
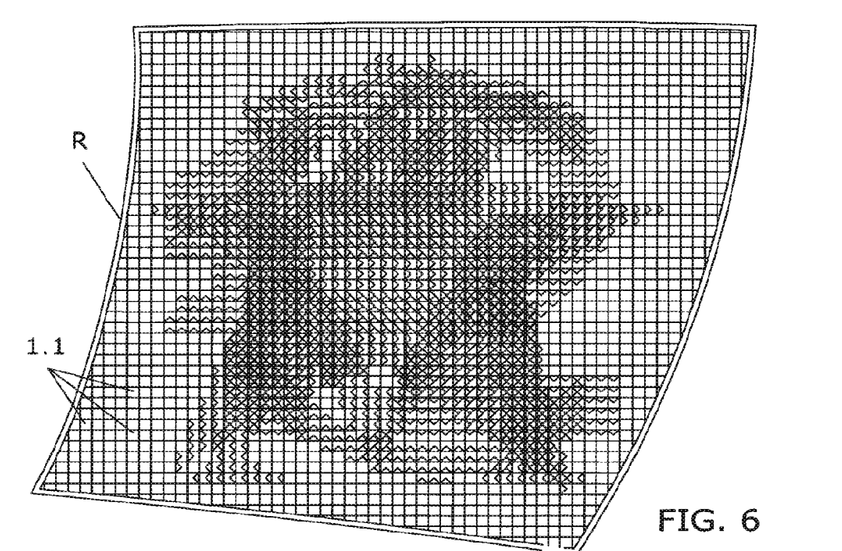
FIG. 6 shows the schematic depiction of a region on which four superimposed images have been defined.

By way of example, FIG. 6 schematically shows a region (R) demarcated above and below by two arched side sectors and two straight sectors. The use of the terms sides, above and below must be interpreted according to the orientation of the drawing. In this embodiment, this region (R) is part of the area of a face of a coin. Four images are shown in this region (R), each able to be viewed from a different orientation, which are superimposed in the projection shown in FIG. 6. The user observing the region (R) will observe an image if he/she is located on the right, another image if he/she is located on the left, another image if he/she is located above and another image if he/she is located below, and the user must always be located a certain distance from the surface.

According to one embodiment, the region (R) has been covered with square-based pyramid-shaped cavities when none of the images assigns a light level different from the first light level. FIG. 6 is said to be a schematic figure because those cavities (1.1) in which all the side facets (1.1.1, 1.1.2, 1.1.3, 1.1.4) are assigned a first light level is depicted therein with a square. Actually the projection of a low relief inverted pyramid would also show the two diagonals, but this schematic depiction intends to indicate which facets (1.1.1, 1.1.2, 1.1.3, 1.1.4) are shown with a light level different from the first light level. These facets (1.1.1, 1.1.2, 1.1.3, 1.1.4) are those identified with a triangle. If the triangle has its longest side upwards inside the square base it must be interpreted that that facet has an inclination different from that which it adopts when it has a first light level.

According to this schematic depiction, each image only assigns one type of triangle: the one having the larger base above, below at either side. A square will have zero, one, two, three or four triangles where each site associated with a facet will have a second light level if a triangle is depicted.

Figure 7:
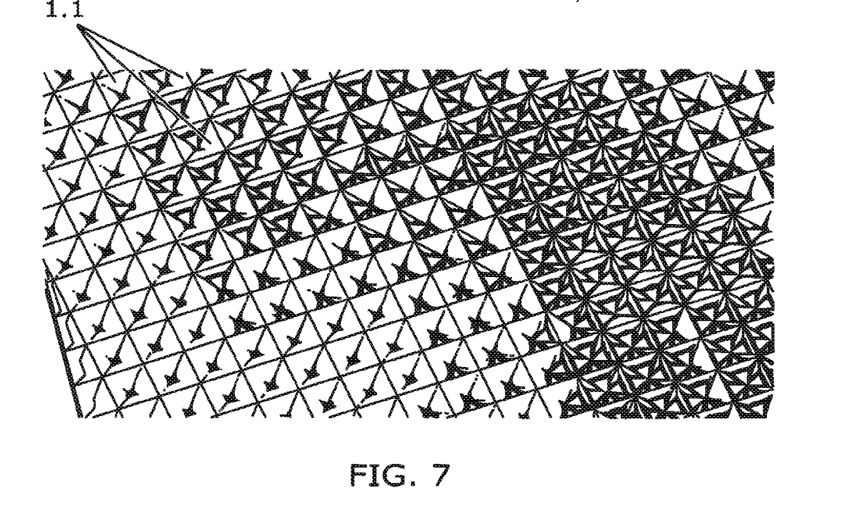
FIG. 7 shows an enlarged view of an image in perspective view of a region with cavities according to one embodiment.

FIG. 7 shows an enlarged detail of an image of the region (R) with the cavities which have been obtained after applying the motif with four images. In this case, the increased slope in those facets which must show a second light level results in a triangle in the base parallel to the base of the cavity (1.1).

The invention claimed is:

1. An object comprising a surface having a region suitable for showing a plurality of images such that each image is observable by a user from a different direction, wherein the region comprises:
   a plurality of cavities distributed on the surface within the region;
   each of the cavities comprises a plurality of side facets, wherein the plurality of facets within each cavity comprises a first facet, a second facet, and a third facet, wherein the first facet of each cavity is associated with a pixel of a first image, wherein the second facet of each cavity is associated with a pixel of a second image, wherein the first image is different than the second image, wherein the first facet of each cavity is associated with a first light level corresponding to the pixel of the first image, and wherein the second facet of each cavity is associated with a second light level corresponding to the pixel of the second image;
   wherein the first facet of each cavity has a first orientation and a first inclination which is angled with respect to the region adjacent each cavity, the first inclination is further associated with the first light level;
   wherein the second facet of each cavity has a second orientation and a second inclination which is angled with respect to the region adjacent each cavity, the second inclination is further associated with the second light level;
   wherein the third facet of each cavity has a third orientation and a third inclination which is angled with respect to the region adjacent each cavity; wherein the first orientation, the second orientation, and the third orientation are different from each other; and
   wherein the object is capable of displaying the same number of images as the number of facets within each cavity.

2. The object according to claim 1, wherein the first facet comprises a first texture and the second facet comprises a second texture, wherein the first texture has a degree of reflection associated with the first light level, and the second texture has a degree of reflection associated with the second light level, and wherein the degree of reflection of the first texture is different from the degree of reflection of the second texture.

3. The object according to claim 1, wherein the first facet has at least one transition surface for connecting with an adjacent facet within each cavity.

4. The object according to claim 1, wherein the region is planar.

5. The object according to claim 1, wherein the third facet of each cavity is associated with a pixel of a third image, and wherein the first image, the second image, and the third image are different from each other.

6. An object comprising a surface having a region suitable for showing a plurality of images such that each image is observable by a user from a different direction, wherein the region comprises:
   a plurality of cavities distributed on the surface within the region;
   each of the cavities comprises a plurality of side facets, wherein the plurality of facets within each cavity comprises a first facet and a second facet, wherein the first facet of each cavity is associated with a pixel of a first image, wherein the second facet of each cavity is associated with a pixel of a second image, wherein the first image is different than the second image, wherein the first facet of each cavity is associated with a first light level corresponding to the pixel of the first image, and wherein the second facet of each cavity is associated with a second light level corresponding to the pixel of the second image;
   wherein the first facet of each cavity has a first orientation and a first inclination which is angled with respect to the region adjacent each cavity, the first inclination is further associated with the first light level;
   wherein the second facet of each cavity has a second orientation and a second inclination which is angled with respect to the region adjacent each cavity, the second inclination is further associated with the second light level;
   wherein the first orientation is different from the second orientation; and
   wherein the plurality of facets correspond with faces of a pyramid, and wherein the pyramid comprises a base and an apex, the base is located on the surface within the region and the apex is located under the surface within the region.

7. The object according to claim 6, wherein:
   the cavities are distributed in rows parallel to an edge or side of the base of one of the cavities, and
   the inclination of at least one facet of adjacent cavities within the same row associated with the first image varies progressively along the row.

8. The object according to claim 7, wherein a cluster formed by the cavities which have facets that share the same inclination per row and are associated with the second light level determine a pattern or second image.

9. The object according to claim 6, wherein the base of the pyramid of one of the cavities is polygonal, and wherein the remaining cavities of the plurality of cavities are distributed such that bases of pyramids of facets of each cavity fit together covering the entire surface within the region.

10. The object according to claim 9, wherein, among the facets, a facet with a greatest inclination associated with a light level different from the first light level has a side common with the base of the pyramid and comprises at least one transition surface adjacent to the apex of the pyramid.

11. The object according to claim 10, wherein the transition surface adjacent to the apex of the pyramid has a degree of reflection different from that of the portion of the facet with the greatest inclination.

12. The object according to claim 10, wherein the transition surface adjacent to the apex of the pyramid is flat and parallel to the base of the pyramid.

13. The object according to claim 12, wherein between two adjacent facets associated with different pixels of different images, a corner transition surface is positioned by extending one of the two adjacent facets with a greatest inclination such that the corner transition surface is parallel to the base and is adjacent to the apex.

14. The object according to claim 6, wherein the base of the pyramid is square.

15. A punch comprising a surface complementary to the surface within the region of the object according to claim 1 intended for generating, by pressure, the surface within the region suitable for showing the plurality of images.

16. A method for generating a surface within a region of an object suitable for showing a plurality of images such that each image is observable by a user from a different direction, wherein the method comprises:
   establishing a configuration of the surface within the region formed by a plurality of cavities according to claim 1, and carrying out a laser carving process on the surface within the region according to the established configuration.

17. The method according to claim 16, wherein the object on which the laser carving is carried out is a powder metallurgy steel.

18. The method according to claim 16, wherein the object on which the laser carving is carried out is a punch, the configuration of the surface within the region is complementary to a surface of the punch which the laser carving is carried out on, and the punch is used to generate, by pressure, the surface within the region suitable for showing the plurality of images.

19. The method according to claim 16, wherein the image to be depicted is transformed into an image containing two intensity levels when the image is viewed from different positions.

* * * * *